US012682606B1

(12) United States Patent
Bouzid et al.

(10) Patent No.: US 12,682,606 B1
(45) Date of Patent: Jul. 14, 2026

(54) OUTPUT ACCURACY REFINEMENT MECHANISM FOR VISUAL PROMPTING

(71) Applicant: LandingAI Inc., Palo Alto, CA (US)

(72) Inventors: Abdelhamid Bouzid, Louisville, KY (US); Mark William Sabini, River Edge, NJ (US); Bastian Diaz Renjifo, Santiago (CL); Whitney Wentworth Blodgett, San Francisco, CA (US); Kai Yang, Fremont, CA (US); Andrew Yan-Tak Ng, Camas, WA (US); Daniel Bibireata, Bellevue, WA (US)

(73) Assignee: LandingAI Inc., Palo Alto, CA (US)

( * ) Notice: Subject to any disclaimer, the term of this patent is extended or adjusted under 35 U.S.C. 154(b) by 357 days.

(21) Appl. No.: 18/227,526

(22) Filed: Jul. 28, 2023

Related U.S. Application Data

(60) Provisional application No. 63/394,258, filed on Aug. 1, 2022.

(51) Int. Cl.
*G06V 10/764* (2022.01)
*G06V 10/771* (2022.01)
*G06V 10/80* (2022.01)

(52) U.S. Cl.
CPC .......... *G06V 10/764* (2022.01); *G06V 10/771* (2022.01); *G06V 10/80* (2022.01)

(58) Field of Classification Search
None
See application file for complete search history.

(56) References Cited

U.S. PATENT DOCUMENTS

| | | | |
|---|---|---|---|
| 9,443,314 B1 | 9/2016 | Huang et al. | |
| 10,032,092 B2 | 7/2018 | Hertzmann et al. | |
| 10,769,766 B1 | 9/2020 | Padfield et al. | |
| 11,182,646 B2 * | 11/2021 | Wang ................... | G06V 10/945 |
| 11,334,762 B1 | 5/2022 | Wrenninge | |
| 11,636,602 B1 | 4/2023 | Havr et al. | |
| 2012/0230564 A1 * | 9/2012 | Liu ..................... | A61B 3/0025 |
| | | | 382/128 |
| 2014/0037198 A1 * | 2/2014 | Larlus-Larrondo ....... | G06T 7/11 |
| | | | 382/173 |

(Continued)

OTHER PUBLICATIONS

Hu et al., "Automatic Pancreas Segmentation in CT Images With Distance-Based Saliency-Aware DenseASPP Network," IEEE Journal of Biomedical and Health Informatics, vol. 25, No. 5, May 2021 (Year: 2021).*

(Continued)

*Primary Examiner* — Soo Shin
(74) *Attorney, Agent, or Firm* — Fenwick & West LLP

(57) ABSTRACT

A device inputs a raw image into a machine learning model, and receives a predicted image comprising a plurality of masks as output from the machine learning model, each mask of the plurality of masks surrounding a plurality of pixels predicted to correspond to a given classification predicted by the machine learning model. The device inputs the raw image and the predicted image into a refinement model, and receives, as output from the refinement model, revised boundaries for each mask of the plurality of masks, the revised boundaries generated by fusing each mask with a boundary determined from the raw image by using a segmentation model. The device outputs classifications for each pixel of the raw image based on the revised boundaries.

17 Claims, 11 Drawing Sheets

(56)          References Cited

U.S. PATENT DOCUMENTS

| | | |
|---|---|---|
| 2018/0300576 A1 | 10/2018 | Dalyac et al. |
| 2020/0401696 A1 | 12/2020 | Ringlein et al. |
| 2021/0081822 A1 | 3/2021 | Davidson et al. |
| 2021/0166076 A1 | 6/2021 | Van et al. |
| 2021/0279957 A1 | 9/2021 | Eder et al. |
| 2022/0245800 A1 | 8/2022 | Champagne |
| 2023/0162354 A1 | 5/2023 | Roy et al. |
| 2023/0196188 A1* | 6/2023 | Horowitz .............. G06N 20/00 |
| | | 209/577 |
| 2023/0244987 A1 | 8/2023 | Truong et al. |
| 2024/0242351 A1 | 7/2024 | Kusu et al. |

OTHER PUBLICATIONS

Lee et al., "TETRIS: Template Transformer Networks for Image Segmentation With Shape Priors," IEEE Transactions on Medical Imaging, vol. 38, No. 11, Nov. 2019 (Year: 2019).*

Wang et al., "Weakly Supervised Deep Learning for Whole Slide Lung Cancer Image Analysis," IEEE Transactions on Cybernetics, vol. 50, No. 9, Sep. 2020 (Year: 2020).*

Zhang et al., "Mask-R-FCN: A Deep Fusion Network for Semantic Segmentation," IEEE Access vol. 8, Jul. 29, 2020 (Year: 2020).*

United States Office Action, U.S. Appl. No. 18/227,522, Jul. 17, 2025, 21 pages.

* cited by examiner

110

Original Image 210
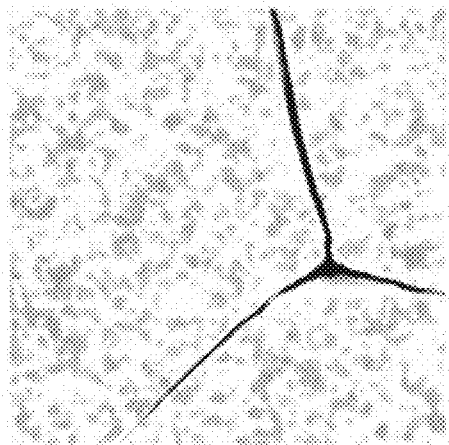
Non-Partially Labeled Image 220
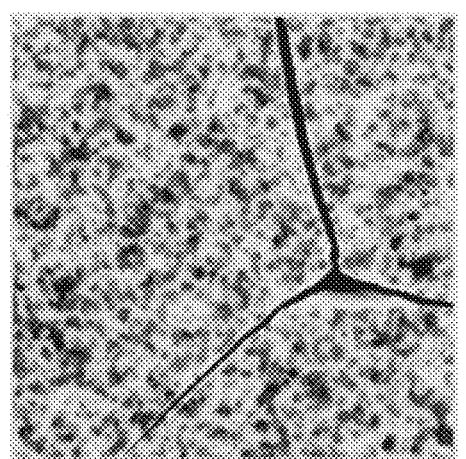
Partially Labeled Image 230
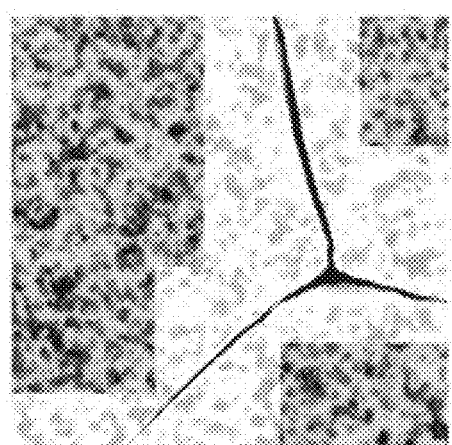
FIG. 2

InstantNet Inference 400

410 Unlabeled Images

420 Patch-Level Feature Extraction

430 Production Model

440 Predictions

600

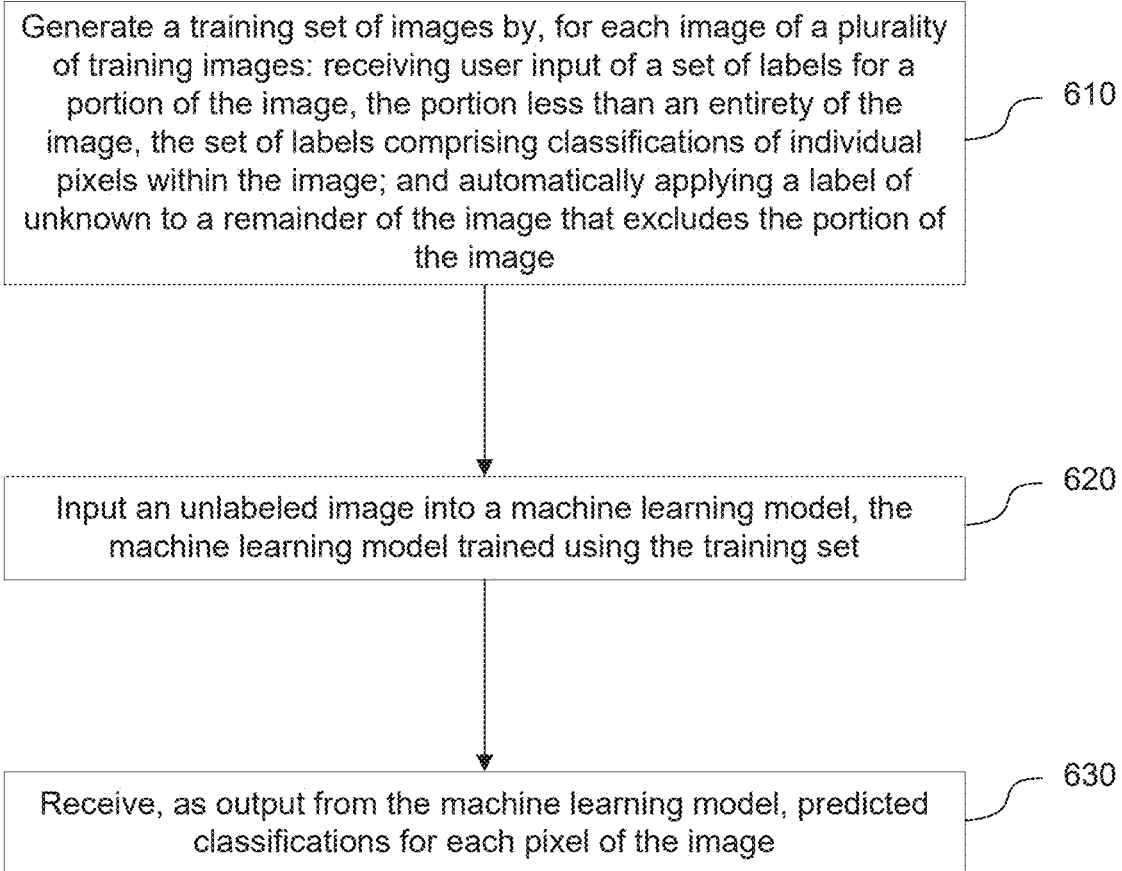

Generate a training set of images by, for each image of a plurality of training images: receiving user input of a set of labels for a portion of the image, the portion less than an entirety of the image, the set of labels comprising classifications of individual pixels within the image; and automatically applying a label of unknown to a remainder of the image that excludes the portion of the image          610

Input an unlabeled image into a machine learning model, the machine learning model trained using the training set          620

Receive, as output from the machine learning model, predicted classifications for each pixel of the image          630

Classifier
820

Raw Image
810

850

Refinement Model
840

Raw Image
810

830

Fusion Model 970

Select Class 1010

Apply Boundary 1020

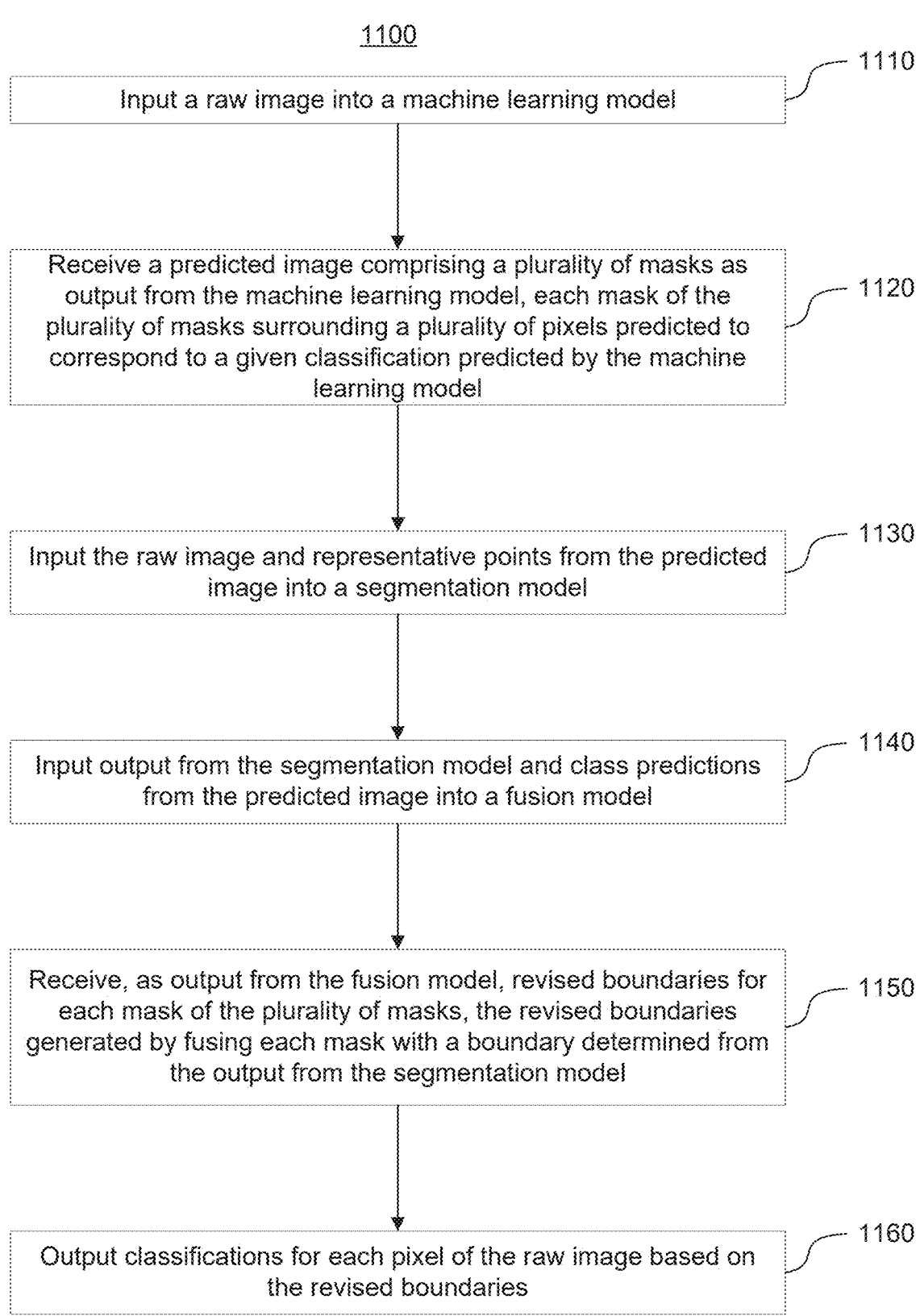

1100

Input a raw image into a machine learning model — 1110

Receive a predicted image comprising a plurality of masks as output from the machine learning model, each mask of the plurality of masks surrounding a plurality of pixels predicted to correspond to a given classification predicted by the machine learning model — 1120

Input the raw image and representative points from the predicted image into a segmentation model — 1130

Input output from the segmentation model and class predictions from the predicted image into a fusion model — 1140

Receive, as output from the fusion model, revised boundaries for each mask of the plurality of masks, the revised boundaries generated by fusing each mask with a boundary determined from the output from the segmentation model — 1150

Output classifications for each pixel of the raw image based on the revised boundaries — 1160

FIG. 11

OUTPUT ACCURACY REFINEMENT MECHANISM FOR VISUAL PROMPTING

CROSS REFERENCE TO RELATED APPLICATIONS

This application claims the benefit of U.S. Provisional Application No. 63/394,258, filed Aug. 1, 2022. The content of which is incorporated herein by reference in its entirety.

TECHNICAL FIELD

The disclosure generally relates to the field of machine learning, and more particularly relates to improved mechanisms for training a machine learning model.

BACKGROUND

In typical deep learning workflows, a user typically labels a large batch of images. The act of labeling is inefficient because every single pixel or instance needs to be labeled, and noisy because where a user is not sure of a classification for a given pixel or instance, the user must label that pixel or instance with a guess that might be wrong. Training a model with this training data could take 10 minutes to 8+ hours, after which a user reviews the model performance. The result is an inefficient workflow in which even a skilled engineer can only iterate their model 1-3 times a day. Furthermore, due to the long cycle time, the effect of (mis) labeling is distanced from the model results. Iterating on this lengthy time horizon additionally requires immense computing resources for training that results in waste where further iteration is required. Due to these factors, developing deep learning models is currently both time-consuming and computationally inefficient in manners that are prohibitive to implementing classification models in various contexts, such as evaluating deficiencies in manufactured items.

SUMMARY

Systems and methods are disclosed herein that rely on a partial labeling mechanism, where users are prompted to label only some of an image and to avoid labeling pixels where a user is unsure of classification (e.g., edge pixels). By avoiding noise and obtaining cleaner training data from partial labeling, the system is able to successfully train a model much more quickly and using much less computational power to predict classifications for new images.

In some embodiments, the system generates a training set of images by, for each image of a plurality of training images, receiving user input of a set of labels for a portion of the image, the portion less than an entirety of the image, the set of labels comprising classifications of individual pixels within the image. The system automatically applies a label of unknown to a remainder of the image that excludes the portion of the image. The system then inputs an unlabeled image into a machine learning model (e.g., a new image requiring classification), the machine learning model trained using the training set. The system receives, as output from the machine learning model, predicted classifications for each pixel of the image.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of an end-to-end data flow for using partial labels to train a model for classification.

FIG. 2 illustrates an exemplary image with examples of non-partial and partial labels, in accordance with an embodiment.

FIG. 6 illustrates an exemplary process for training using partial labeling, in accordance with an embodiment.

FIG. 11 illustrates an exemplary process for refining masks output by a classification model trained using partial labeling, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
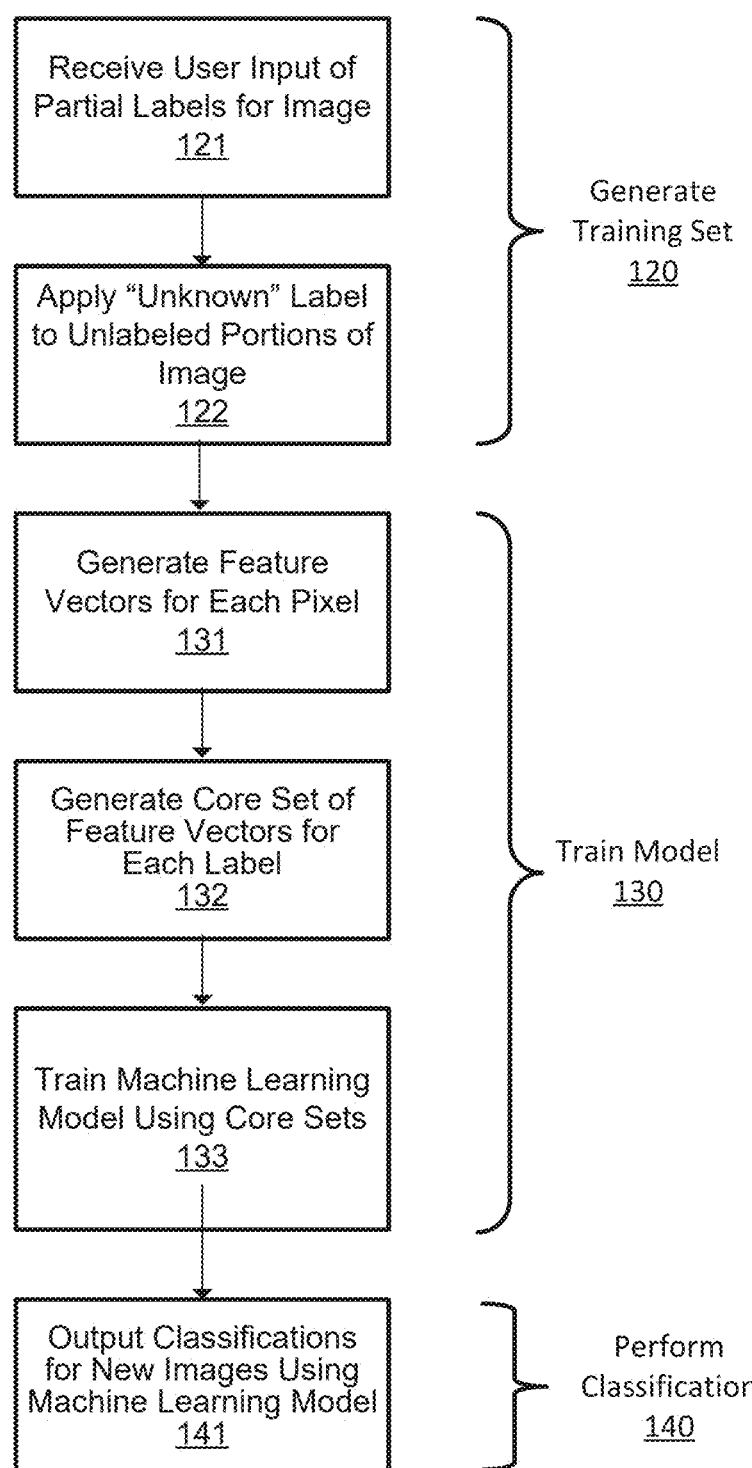

Figure (FIG. 1 illustrates one embodiment of an end-to-end data flow for using partial labels to train a model for classification. Process 110 may be executed by one or more processors of a classifier service. The classifier service may be instantiated by one or more servers, the servers communicatively coupled with one or more client devices by way of a network. The one or more client devices may have an application installed thereon that is designed to interface with the classifier service. For example, the application may be a dedicated application for the classifier service. As another example, the application may be accessed by way of a browser installed on the one or more client devices. Some or all activity discussed in this disclosure with respect to the classifier service may be performed by the client devices, either in distributed fashion or entirely on-premises on one or more of the client devices.

Process 110 begins with the classifier service generating 120 a training set, which includes sub-steps of receiving 121 user input of partial labels for an image, and applying 122 an "unknown" label to unlabeled portions of the image. Turning for the moment to FIG. 2 for context, FIG. 2 illustrates an exemplary image with examples of non-partial and partial labels, in accordance with an embodiment. FIG. 2 depicts an original image 210 of a tile having cracks and a chip. In an embodiment, a user inputs into the application of the classifier service non-partial labels 220 for an image, which requires labeling every single pixel with an explicit class (e.g., OK, shaded in purple; crack, labeled in red; and chip, labeled in green) before determining that labeling is complete. This makes segmentation labeling extremely expensive because labels must be pixel-perfect. In addition, even on ambiguous regions of the image, the user is forced to assign a class label, which can introduce significant labeling noise.

In a preferred embodiment, rather than inputting non-partial labels 220, the classifier service prompts (e.g., using the application) the user to input partial labels for partially labeled image 230. In partial labeling, the application enables the user to selectively label portions of the image. Responsive to determining that selective labeling is complete, the application designates all unlabeled regions as "unknown". The result is an enormous time savings, as the user no longer needs to draw pixel-perfect mask boundaries. Moreover, the classification and can feed in only the relevant portion of an image to for training a model. Further, should a portion of the image be ambiguous to label, the user can choose to leave said portion unlabeled to avoid adding labeling noise.

Figure 3:
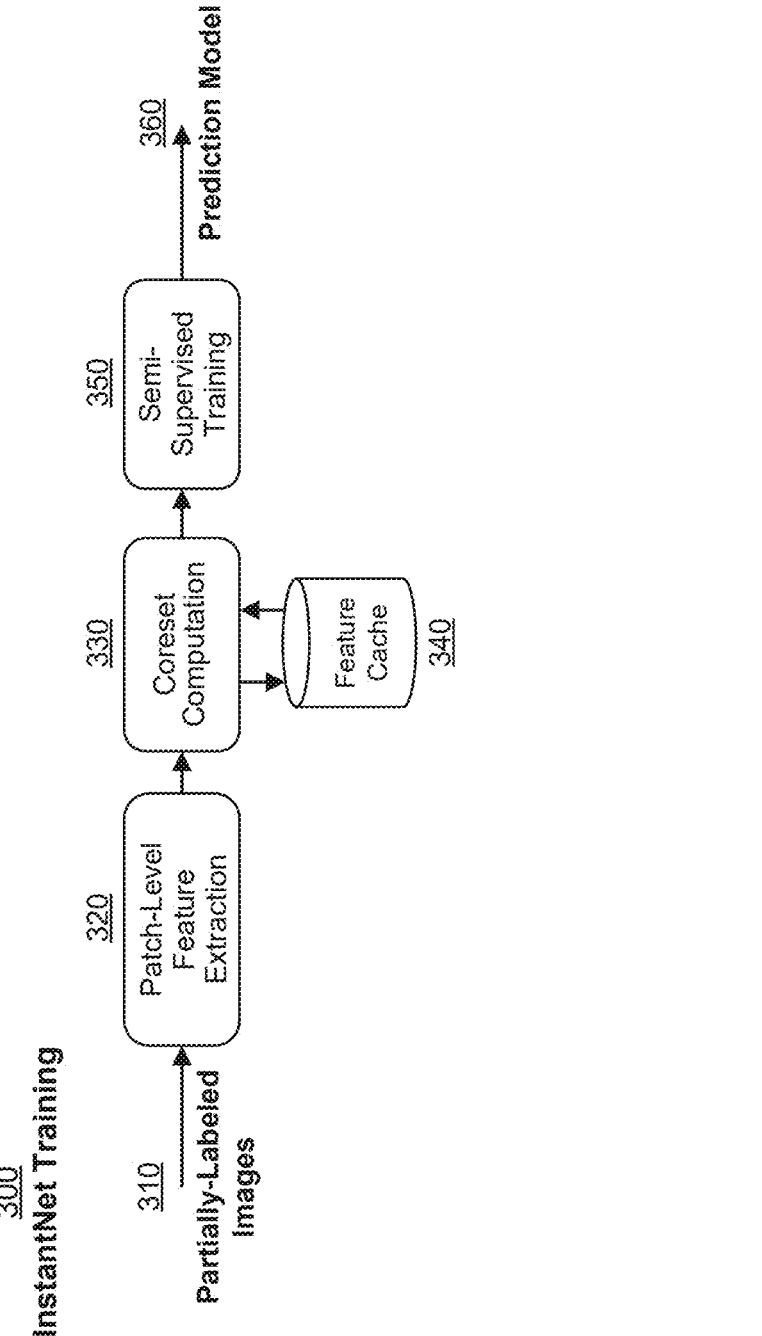
FIG. 3 illustrates an exemplary process for training a prediction model, in accordance with an embodiment.

Returning to FIG. 1, after the training set is generated using partial and unknown labels, the classifier service trains 130 a predictive model. The term predictive model, as used herein, is used interchangeably with other terms (e.g., InstantNet, machine learning model, classifier model, and the like), where all of these terms should be treated equally. The elements of training 130 may include generating 131 feature vectors for each pixel, generating 132 a core set of feature vectors for each label, and training 133 the machine learning model using the core sets. Turning to the moment to FIG. 3 for context, FIG. 3 illustrates an exemplary process for training a prediction model, in accordance with an embodiment.

Process 300 begins with taking partially labeled images 310 (e.g., corresponding to partially labeled image 230) and extracting 320 patch-level features. In an embodiment, the classifier system applies a pre-trained encoder network to each partially labeled image 310 to extract patch-based features. Exemplary encoder networks may include a general-purpose feature extractor, a neural network tuned for a specific task, and the like. As an output from this step, the classifier service generates feature vectors (131) using the extracted features for each pixel of the partially labeled image.

Process 300 goes on to perform a coreset computation 330 (mapping to element 132 of model training 130). Here, the classifier service compresses the feature set for each image (e.g., by 20-30×) and efficiently selects the most important feature vectors to add to a core set. In order to achieve this compression, the classifier service may sample the feature vectors for each class (that is, each label type), resulting in a subset of feature vectors. The classifier service may require (e.g., based on settings that are default or established by an administrator) a certain number of vectors per class for a core set. Therefore, after sampling the feature vectors, the classifier service may arbitrarily, randomly, or according to some heuristic select one feature vector as a seed vector. The classifier service may perform a comparison operation to identify which other feature vector is most different from the seed vector, and add that different feature vector to the core set. This operation may be repeated, either relative to the seed vector, the different vector, further different vectors, or restarted from scratch, until the certain number of vectors is satisfied. In an embodiment, the classifier service caches this core set on disk (e.g., to feature cache 340) to optimize subsequent trainings. In this manner, feature sets and core sets need not be changed unless a user's label changes. For example, responsive to detecting a label change to a training example, the classifier service may discard core sets for images having that label and recompute the core sets for those images. As an advantage, the heavy compression achieved by generating core sets enablers the predictive model to be trained in under 10 seconds for 40 images, and under 35 seconds for 350 images.

Moving on to training 133 the machine learning model using the core sets, a semi-supervised training process 350 may be used. In an embodiment, using the coresets from the partially labeled images, the classification service trains a lightweight network to provide pixel-level predictions. For example, the classification service may train a semi-supervised model (e.g., a MeanTeacher model) using Interpolation Consistency Training (ICT) regularization to leverage the partial labels on the images.

Applying semi-supervised learning along with ICT regularization enables the predictive model to generalize well and operate on a small amount of data. Semi-supervised training is a method of training that forces a model to be consistent on unlabeled data. For example, all pixels with a label of "unknown" are treated consistently through a semi-supervised training process. In an example, the semi-supervised model may include two models, a student model and a teacher model. The student model may be a fully supervised network, with a loss function and backpropagation based on the loss function. The student model alone might inconsistently treat the data that has a label of "unknown." To address this, a teacher model may also be implemented that is an unsupervised model. In training the student model, the student model is forced to agree with the teacher model in classifying the "unknown" labeled data, where the unsupervised teacher model clusters the unknown labeled data for consistency. Augmenting this with ICT forces the semi-supervised model to learn a smooth decision boundary, where the ICT interpolates between examples, the output of the network is forced to be consistent with the interpolation.

Figure 4:
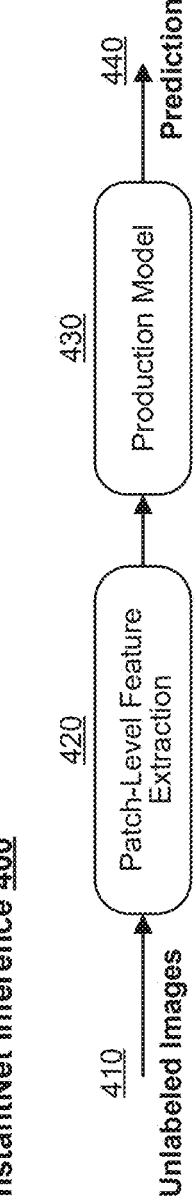
FIG. 4 illustrates an exemplary process for predicting labels for unlabeled images, in accordance with an embodiment.

Returning to FIG. 1, process 110 concludes with performing 140 a classification, which in turn involves outputting 141 classifications for new images using the predictive model. Turning to FIG. 4 for context, FIG. 4 illustrates an exemplary process for predicting labels for unlabeled images, in accordance with an embodiment. As depicted in FIG. 4, process 400 begins with a user inputting (e.g., via an application of the classification service) unlabeled images 410. The classification service performs patch-level feature extraction 420 (e.g., in a similar manner to patch-level feature extraction 320). The classification service then inputs the extracted features into prediction model 430, which outputs predictions 440 of labels for each pixel of the unlabeled images (e.g., based on the training process shown in FIG. 3).

As shown above, each of the components of the Instant-Net pipeline contributes a desirable trait to the model, allowing it to have good out-of-box performance, be trained in seconds, have high generalization, and require only a small amount of data for training.

Exemplary Workflow

The processes described in the foregoing text enable a highly iterative and streamlined workflow that allows the user to go from completely unlabeled data to a decently-performing trained model in a matter of minutes, if not seconds. This workflow is sometimes called the Instant Learning workflow, which represents a fundamental shift in the user experience for working with deep learning models. At a high-level, the workflow is as follows.

A user examines an unlabeled image, determines the salient classes or concepts present, and inputs labels for the pixels of the image according to the partial labeling scheme (e.g., by interfacing with an application of the classification service). This may be done for one or several images, resulting in a training set. The classification service detects a selection by the user of an option to train a predictive model using the training set, and then trains the model (e.g., using the process 300 of FIG. 3). After a short amount of time (e.g., a few seconds), the model is trained. The classification service outputs predictions for review by the user; if the predictions are satisfactory, the user may deploy the model. Otherwise, the classification service may receive input of modified labels, or additional labels (where an "unknown" label was previously applied), and may re-train the model on this basis. With proper implementation, the user can go through one round of the Instant Learning workflow in less than a minute.

Exemplary Application

Figure 5:
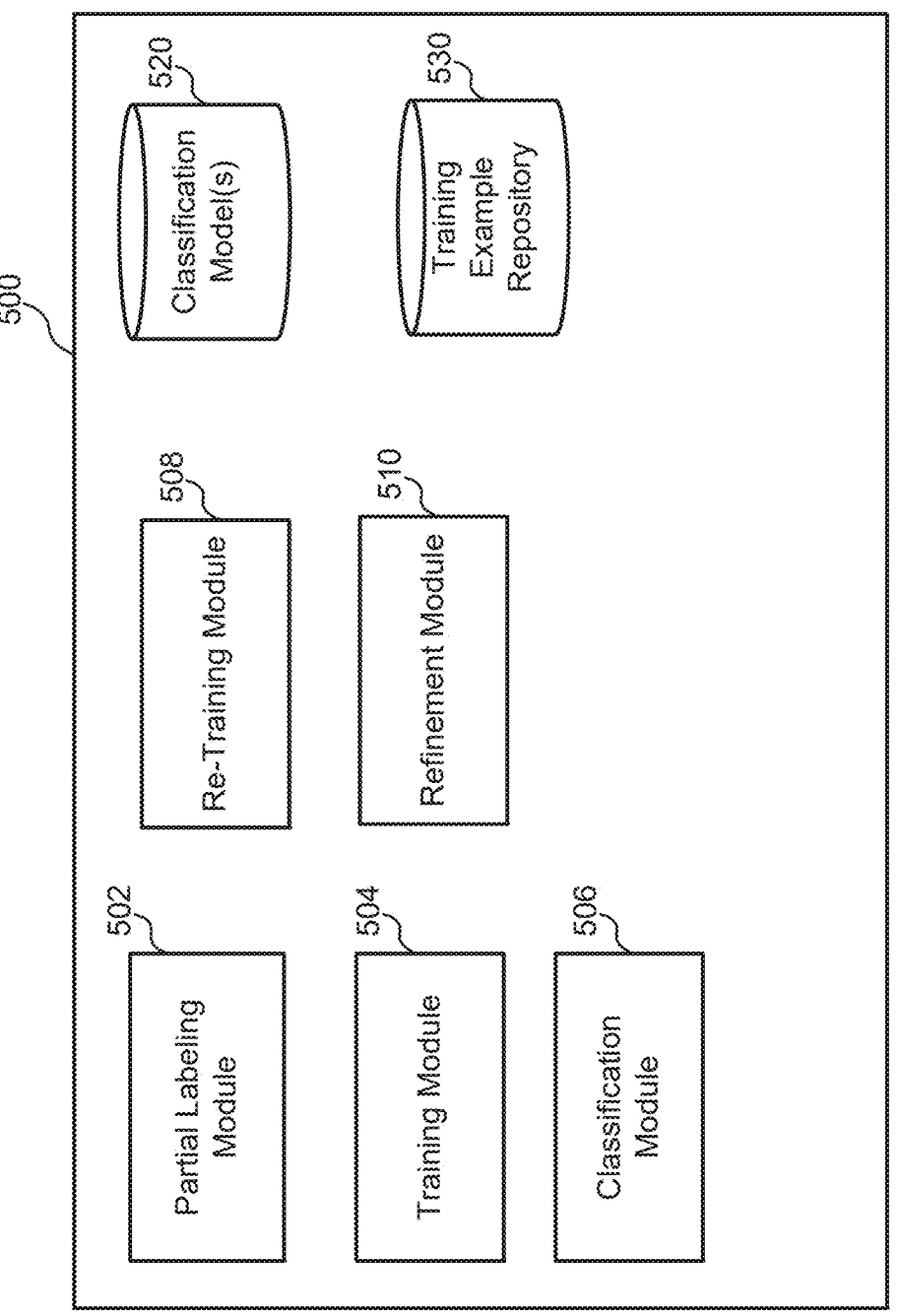
FIG. 5 illustrates exemplary modules of a partial labeling tool, in accordance with an embodiment.

FIG. 5 illustrates exemplary modules of a partial labeling tool, in accordance with an embodiment. As illustrated in FIG. 5, partial labeling tool 500 includes partial labeling module 502, training module 504, classification module 506, re-training module 508, refinement module 510, as well as classification models 520 and training example repository 530. More or fewer modules and/or databases may be used to achieve the functionality disclosed herein. Partial labeling tool 500 may be instantiated at one or more servers and/or at one or more client devices that access the one or more servers by way of a data communications network, such as the Internet. Partial labeling tool 500 may be wholly instantiated at a server and/or at a client device, or may have distributed processing across several of such entities. Partial labeling tool 500 may provide (directly or through a third party app distributor) an application downloadable to a client device that provides a user interface providing any user interface functionality disclosed herein. Alternatively or additionally, user interfaces discussed herein may be operated using a browser through which partial labeling tool 500 is accessed by way of a client device.

Partial labeling module 502 may be used in whole or in part to generate training data for use in training a predictive model (e.g., InstantNet model). Partial labeling module 502 may generate for display to a user an interface for inputting partial labels. (e.g., as discussed above with respect to generating 120 a training set with reference to FIG. 1, and as discussed above with respect to generating partially labeled image 230). Partial labeling module 502 may display the user interface by way of an application installed to a client device and/or by way of a browser. Partial labeling module 502 may select an image for partial labeling from or based on one or more images selected by an administrative user. As an example, an administrative user may provide an image of a cracked tile to partial labeling tool 500. Partial labeling module 502 may select that image for provision to a user for partial labeling, and/or may select one or more other unlabeled images from training example repository 530 for partial labeling based on similarity to the provided image. For example, partial labeling module 502 may generate a feature vector from the example image of the cracked tile, and may retrieve from training example repository 530 a set of unlabeled images that, when transformed into feature vectors, have at least a threshold similarity (e.g., as determined using an unsupervised machine learning model such as a clustering model). One or more of the set of unlabeled images may be provided, by partial labeling module 502, for partial labeling by a user.

Partial labeling module 502 receives user input of a set of labels for a portion of the image, the portion less than an entirety of the image, the set of labels comprising including of individual pixels within the image. In an embodiment, partial labeling module 502 receives a pixel-by-pixel selection of a classification for the image from a user. In an embodiment, partial labeling module 502 receives input of a bounding polygon (e.g., by way of a drag-and-drop operation and/or a free drawing operation), where pixels within the bounding polygon are all together selected as having a given classification (e.g., simultaneous selection). Partial labeling module 502 may provide zoom options to enable a user to more granularly review pixels at a larger scale and select classifications for those pixels. Partial labeling module 502 receives input indicating that a partial labeling operation being performed by the user has ended, and automatically applies a label of unknown to a remainder of the image that has not yet been labeled (e.g., by applying an unknown label to each unlabeled pixel).

Training module 504 trains a machine learning model to predict labels for pixels of a new image. In order to train 130 the machine learning model (e.g., using process 300), training module 504 may generate a plurality of feature vectors comprising a feature vector for each pixel of an image, and may map each feature vector to a label corresponding to the pixel from which each feature vector was derived (e.g., the label input by the user, or an "unknown" label). These feature vectors may be used to train the machine learning model, enabling the machine learning model to predict a pixel classification for pixels of a new image.

In an embodiment, for each different label of the training set, training module 504 may generate a core set of feature vectors. The core set includes fewer than all of the feature vectors mapped to each label, as described above with respect to FIG. 3. Training module 504 uses the core set to train the machine learning model to the exclusion of other feature vectors for a given label, where feature vectors for the given label that are not within the core set are not used to train the machine learning model. In an embodiment, training module 504 generates the core set of feature vectors for a given label by sampling the plurality of feature vectors to obtain a subset, and then by adding additional feature vectors to the subset until a criterion is reached. The criterion may be a predetermined number of vectors required to form a core set. Training module 504 may add additional feature vectors to the subset by identifying, for a given feature vector of the subset, a furthest feature vector of the plurality of feature vectors that is not already in the subset, and then by adding the furthest feature vector to the subset. A semi-supervised training technique may be applied to the core set, such as Mean Teacher (described above) to train the machine learning model.

Classification module 506 receives an unlabeled image (that is, a new image), and inputs the unlabeled image into a machine learning model for classification, the machine learning model trained using the training set. In an embodiment, classification module 506 receives the image based on input of the image into partial labeling tool 500 (e.g., by way of an application installed on a client device). In an embodiment, classification module 506 automatically receives images on an ongoing basis as the images are captured. For example, images may be captured at one or more points along a manufacturing line, and may be input into classification module 506 in order to detect defects, such as cracks in tiles, blemishes in glass, scratches in metal, and so on, where defects are candidate classifications for the item of manufacture. Classification module 506 may receive images as they are captured, and may classify objects of manufacture as defective or not defective (or something more granular, such as having a certain type of defect). The output of classification module 506 may be used to interface with a human being and/or a machine. For example, an application protocol interface between classification module 506 and a manufacturing line component may be used to transmit a defect classification to the manufacturing line component, which may in turn divert the manufactured object to a defective items line, rather than an items ready for shipment line.

In an embodiment, classification module 506 prompts a user to enter rules for classification. That is, classification module 506 may receive, by way of user input into a user interface, definitions of conditions that result in a certain classification. For example, where an image of an object is found to have predictions of certain pixel classifications (and/or at least a threshold amount of a pixel classification), the object is defined to have a certain classification (e.g., OK or No Good; or more granularly, classify as a scratch where scratch pixels take up at least 5% of an image).

Re-training module 508 may receive further input indicating that a classification is incorrect. In response to receiving the further input, re-training module 508 may re-label images of the training set having pixels with the classification with an adjusted classification and re-train the machine learning model accordingly using training module 504. For example, a human being may determine that an object classified as having a defect does not actually have a defect (e.g., by reviewing objects in the defective items line), and may re-classify one or more pixels within its image accordingly. This re-classification may trigger a search by re-training module 508 to identify training examples for the given object having feature vectors that are at least having a threshold similarity to the re-classified pixels and to apply the new classification to those pixels, and then to re-train the classifier using the updated training examples, thus resulting in a more accurate classification the next time an image is received having similar pixel attributes.

FIG. 6 illustrates an exemplary process for training using partial labeling, in accordance with an embodiment. Process 600 begins with one or more processors of partial labeling tool 500 executing instructions that cause modules to perform the operations of process 600. Process 600 begins with partial labeling tool 500 generating 610 a training set of images by, for each image of a plurality of training images, receiving user input of a set of labels for a portion of the image, the portion less than an entirety of the image, the set of labels comprising classifications of individual pixels within the image, and automatically applying a label of unknown to a remainder of the image that excludes the portion of the image. For example, partial labeling tool 500 uses partial labeling module 502 to generate training data according to the activities described with respect to FIG. 2.

Partial labeling tool 500 inputs 620 an unlabeled image into a machine learning model, the machine learning model trained using the training set (e.g., using training module 604, trained using process 300). Partial labeling tool 500 receives, as output from the machine learning model, predicted classifications for each pixel of the image (e.g., using classification module 506, using process 400 to form predicted classifications).

In some embodiments, following process 600, the output of classification module 506 may suffer from noise. That is, the output may include a plurality of masks, each boundary of each mask defining an area within the boundary that has a given classification. The boundaries may be imprecise due to the use of small amounts of training data through the partial labeling process described above, which may result in over-fitting or under-fitting of the data that forms masks that cover large areas having an incorrect classification. Refinement module 510 may be used to refine the masks by referring back to the original raw image to adjust the masks to more accurately reflect different features of an object presented in the image.

Figure 7:
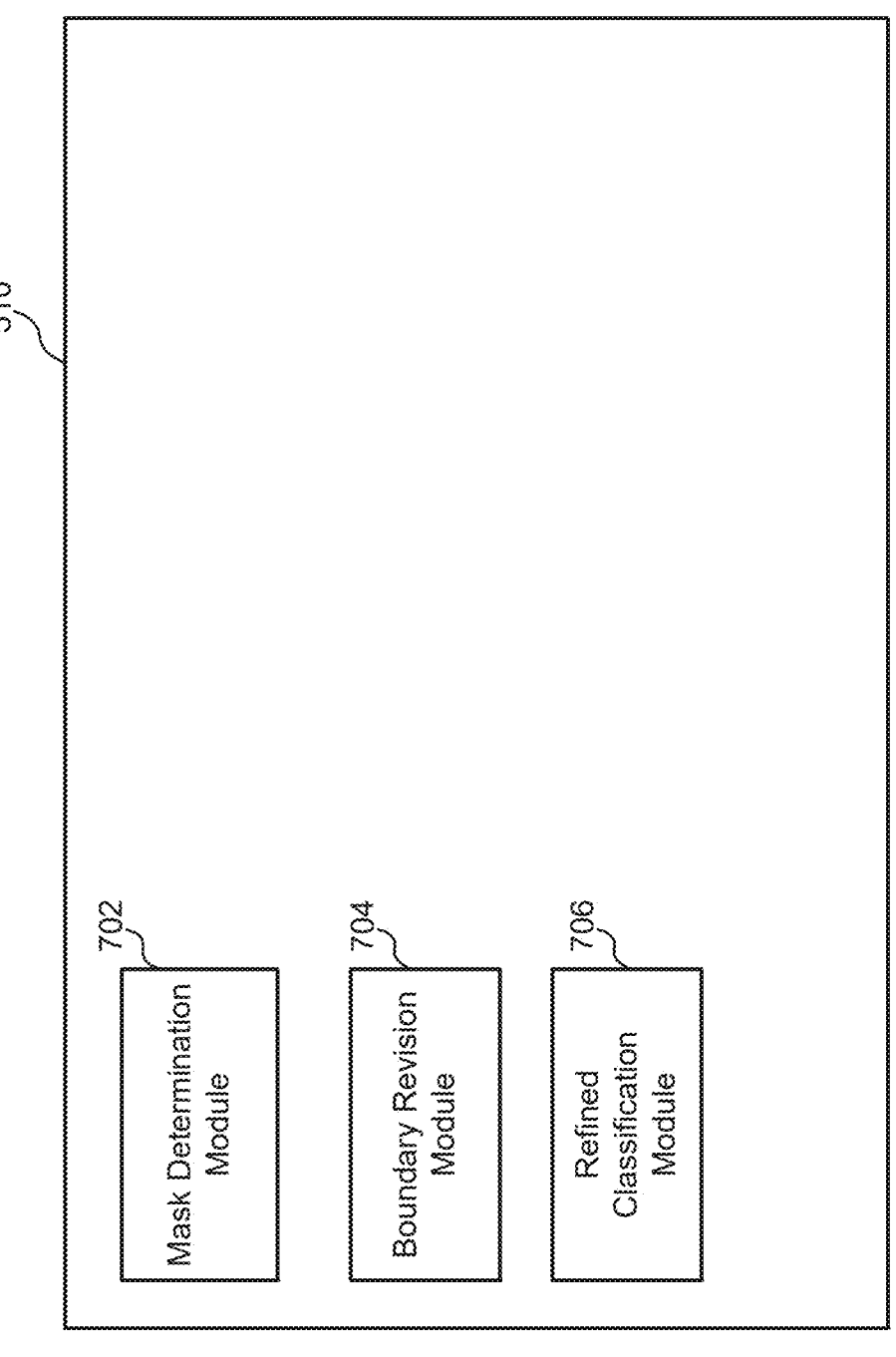
FIG. 7 illustrates exemplary modules of a refinement module of the partial labeling tool, in accordance with an embodiment.

FIG. 7 illustrates exemplary modules of a refinement module of the partial labeling tool, in accordance with an embodiment. As depicted in FIG. 7, refinement module 510 includes mask determination module 702, boundary revision module 704, and refined classification module 706. More or fewer modules and/or databases may be used to achieve the functionality disclosed herein.

Mask determination module 702 determines boundaries of masks, each mask defining an area within its boundary that is of a given class. Masks can include an area of any number of pixels, from one to a maximum number of pixels for an image (e.g., in a scenario where an entirety of an image has pixels only of one class), and any number in between. Mask determination module 702 determines the boundaries based on an output of, e.g., process 100 and/or 600, by taking pixel classifications determined for a raw image by a classifier trained using partial labeling on training images. Mask determination module 702 determines the boundaries by identifying outer-most pixels of an area having continuous pixels of a given same classification. The term "continuous pixels" may be defined, e.g., by an administrator, as following any heuristic, such as requiring continuous connection between pixels of a same class to be continuous, or allowing for a margin of error (e.g., two pixels of a same class may be continuous where there are up to a threshold number of pixels of another class between them, the threshold determined by an administrator).

Figures 8A, 8B:
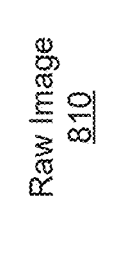
FIG. 8A depicts an example data flow performed in connection with mask determination.
FIG. 8B depicts an example data flow performed in connection with refining classification masks derived from a raw image.

Turning briefly to FIG. 8A, FIG. 8A depicts an example data flow performed in connection with mask determination. Raw image 810 is input into classifier 820, which has the functionality of process 400 of FIG. 4. Mask determination module 702 determines a mask based on continuous pixel classifications output by classifier 820, resulting in masks 830. As shown in FIG. 8A, where an object features a triangle of a given class, a mask may be inaccurate and may not exactly encompass the triangle due to noise, thus resulting in an opportunity for improvement by way of a refinement.

Turning back to FIG. 7, boundary revision module 704 revises the boundaries to more accurately encompass portions of an object having a given class. In order to revise the boundaries, boundary revision module 704 may input the raw image and the predicted image into a refinement model, and may receive, as output from the refinement model, revised boundaries for each mask of the plurality of masks. As will be explained in further detail below, the revised boundaries generated by fusing each mask with a boundary determined from the raw image by using a segmentation model. This is depicted in further detail in FIG. 8B. Turning briefly to FIG. 8B, FIG. 8B depicts an example data flow performed in connection with refining classification masks derived from a raw image. As depicted in FIG. 8B, raw image 810 and masks 830 are input into refinement model 840. Refinement model 840 outputs refined masks 850, which more accurately track the objects of different classes within raw image 810. The refined masks are used to generate an output of a classification for each pixel of the raw image based on the revised boundaries of the refined masks.

In order to perform mask refinement, refinement model 840 first identifies representative points within each mask. To do this, refinement model 840 may deploy a connected components analysis. The connected components analysis determines a relative size of each component within an image, each component being a portion of the image having a given class. So, where there are two masks on an image, it might be determined that one mask covers 30% of an area of a raw image, and another mask covers 50% of an area of the raw image. A number of points are then allocated to each mask's area from a total number of points. In an embodiment, the total number of points may be computed using the equation total=log (ax+b), where x is the area of the image, and a and b are coefficients. In another embodiment, the total number of points may be predetermined. For example, where 1000 points in total are to be allocated, 300 of those points would be used in the first afore-mentioned mask, and 500 of those points would be in the second afore-mentioned mask.

After allocating a number of points for each mask, refinement model 840 finds the points within each mask. In an embodiment, refinement model 840 may find the points using a coreset. This may be performed similarly to the core set computation mentioned with respect to process 300. For example, refinement model 840 may sample feature vectors for each pixel within the area of a mask, and then add additional feature vectors until the number of points allocated to the mask is reached, by way of the process mentioned with regard to 330, where the "criterion" mentioned in 330 in this case is equivalent to reaching the number of allocated points for each mask. In another embodiment, instead of or in addition to using a core set, refinement model 840 may apply a distance transformation for the pixels within the mask. Core sets tend to be more effective where a boundary is linear and/or convex, and distance transformation tends to be more effective where a boundary is concave or jagged. In an embodiment, refinement model 840 determines whether a boundary of a mask is primarily linear and/or convex. Responsive to determining that the boundary of the mask is primarily linear and/or convex, refinement model 840 determine to use a core set algorithm. Responsive to determining that the boundary of the mask is not primarily linear and/or convex, refinement model 840 applies a distance transformation.

Regardless of how the representative points are determined, refinement model 840 also applies a segmentation model to the raw image along with prompts that indicate the representative points to determine which masks to draw using the segmentation model. The segmentation model may be a Segment Anything Model (SAM) or any other segmentation model that automatically determines edges around an object within an image. Segmentation models output an accurate boundary around an object, but do not include class information. Therefore, refinement model 840 has determined representative points for each class within an image using outputs from the classifier, and boundaries of an object using outputs of the segmentation model from the original raw image and the prompts. Refinement model 840 fuses these two outputs together using a fusion model, discussed in further detail below with respect to FIG. 10.

Figure 9:
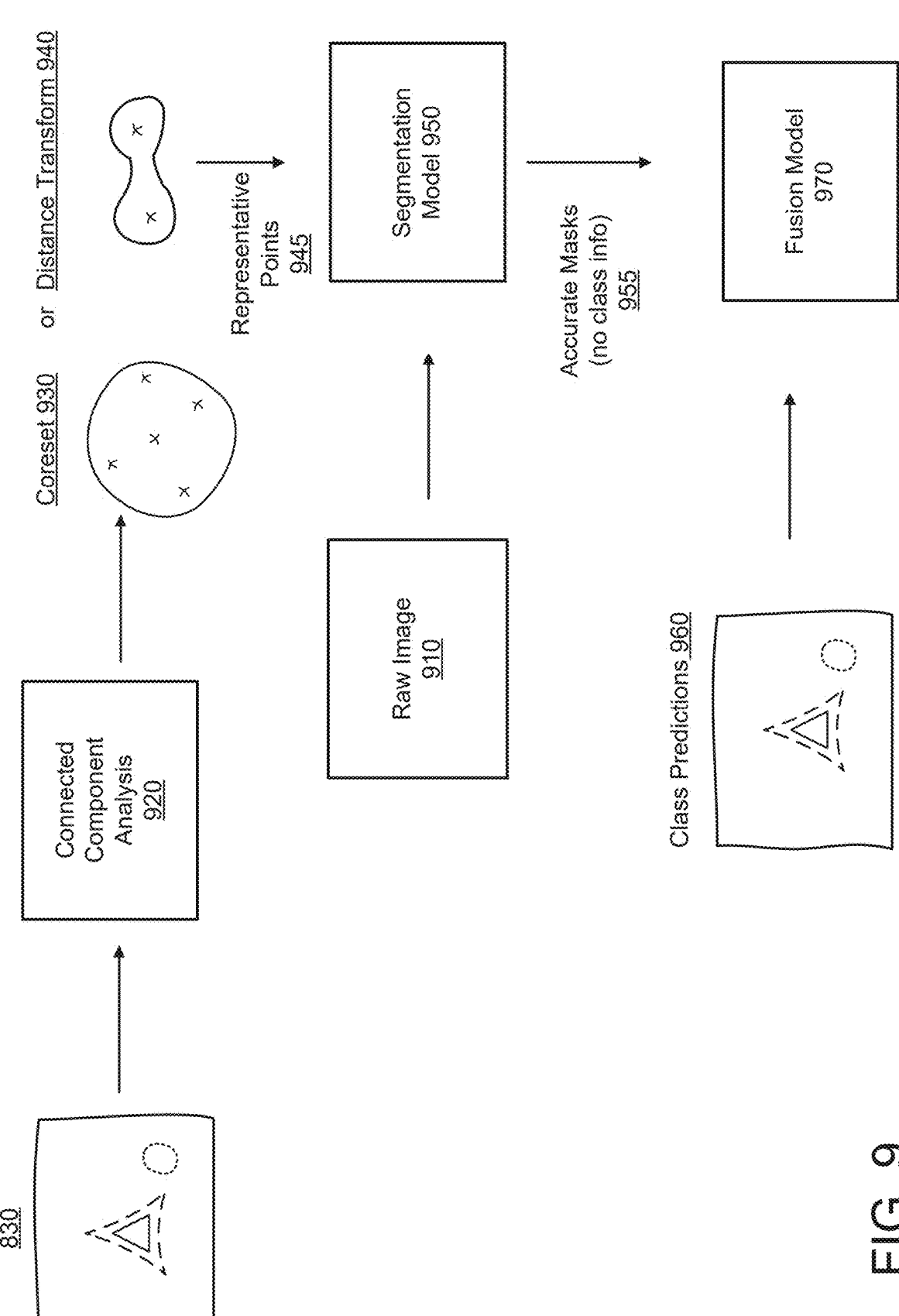
FIG. 9 depicts a process performed by a refinement model, in accordance with an embodiment.

To illustrate the processes performed by refinement model 840, we now turn to FIG. 9. FIG. 9 depicts a process performed by a refinement model, in accordance with an embodiment. As shown in FIG. 9, refinement model 840 takes masks 830 (e.g., as output by the classifier 820) and runs them through a connected component analysis 920 to determine representative points within the raw image. Refinement model 840 determines the representative points 945 for raw image 910 in the same manner disclosed above with respect to FIG. 8, applying the procedure to each component resulting from the connected component analysis 920. The components resulting from the connected components analysis are themselves masks (whose union results in masks 830), and it is for each component that the number of points to allocate is found (discussed below with respect to fusion model 970), as well as the representative points. More specifically, refinement model 840 applies a coreset algorithm 930 and/or a distance transformation 940 to the output of the connected components analysis 920, thereby resulting in representative points 945. Refinement model 840 then applies, as input to segmentation model 950, prompts indicating the representative points 945 along with raw image 910. Refinement model 840 supplies the output of the segmentation model 950, which includes accurate masks 955 that do not include classification information, along with class predictions 960 (which include the masks and their respective classifications determined using classifier 820, and in some embodiments is or includes masks 830) to fusion model 970 in order to fuse the segments and the representative points together to combine the boundary and class information into refined masks having more precise boundaries.

Fusion model 970 performs fusion by first using the representative points to determine a class for a mask, and then applies the class to each of the pixels within a boundary determined by the segmentation model. In an embodiment, each of the masks within an image may be of varying size, and fusion model 970 may rank the masks by size. Fusion model 970 may then perform fusion first on a largest mask, then on a next largest mask, and so on, until all masks are assigned refined boundaries.

In order to determine a class for a mask using the representative points, fusion model 970 takes all of the points within an interior of a given one of accurate masks 955, and overlays corresponding locations in the class predictions 960. Fusion model 970 performs majority voting on the class predictions 960 within each of the accurate masks (that is, determines which pixels are, relative to other pixels within the mask, of a majority class where there are more pixels of that class than any other class), and assigns the majority class to each of the pixels within the segment boundary, which is illustrated further in FIG. 10.

Figure 10:
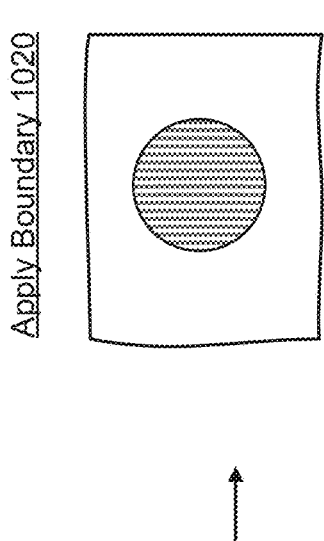
FIG. 10 depicts activity of a fusion model in combining a segment boundary derived from a raw image with a class determination using masks from a classifier model.

FIG. 10 depicts activity of a fusion model in combining a segment boundary derived from a raw image with a class determination using masks from a classifier model. As depicted in FIG. 10, fusion model 970 determines which pixels having a given classification are in a majority relative to other classifications within an accurate mask 955. That majority class (in this case, the class represented by the vertical stripes) becomes a selected class 1010. Fusion model 970 then applies the selected class 1010 to all pixels within the corresponding segment boundary determined by segmentation model 950.

FIG. 11 illustrates an exemplary process for refining masks output by a classification model trained using partial labeling, in accordance with an embodiment. Process 1100 begins with one or more processors executing instructions that cause refinement module 510 to perform operations, including inputting 1110 a raw image into a machine learning model (e.g., using mask determination module 702). Refinement module 510 receives 1120 a predicted image comprising a plurality of masks as output from the machine learning model, each mask of the plurality of masks surrounding a plurality of pixels predicted to correspond to a given classification predicted by the machine learning model.

Refinement module 510 inputs 1130 the raw image and representative points from the predicted image into a segmentation model (e.g., segmentation model 950). Refinement module 510 inputs 1140 output from the segmentation model and class predictions from the predicted image into a fusion model. Refinement module 510 receives 1150, as output from the fusion model, revised boundaries for each mask of the plurality of masks, the revised boundaries generated by fusing each mask with a boundary determined from the output from the segmentation model. Refinement module 510 outputs 1160 classifications for each pixel of the raw image based on the revised boundaries.

In some embodiments, because refinement algorithm is not perfect, the masks output by the segmentation model might be of poor quality, or the representative points might be poorly chosen. In these cases, the refinement algorithm can alter the original predictions drastically and cause a completely wrong output. To prevent this outcome, in some embodiments, fusion model 970 may compare the mIoU (mean intersection over union) between original predictions and the refined predictions. If mIoU>=0.5 (or some other user-defined threshold), then the refined predictions have a high overlap with the original, and are most likely a good refinement. In that case, the fusion model 970 may output the refined predictions. However, if mIoU<0.5 (or some user-defined threshold), the refined predictions changed too much from the original. In that case, responsive to mIoU being below the threshold, fusion model 970 may output the original predictions and discard the refined ones.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a partial labeling training process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
inputting a raw image into a machine learning model;
receiving a predicted image comprising a plurality of masks as output from the machine learning model, each mask of the plurality of masks surrounding a plurality of pixels predicted to correspond to a given classification predicted by the machine learning model;
for each mask of the plurality of masks:

determining an extent of the mask using a connected components analysis;

allocating a number of points based on a relative extent of the mask as compared to given extents of each other mask of the plurality of masks;

selecting representative points corresponding to the number of points that are representative of an area within the mask;

inputting the raw image and the representative points from the predicted image into a segmentation model and receiving output from the segmentation model including, for each mask, a segment around the representative points;

inputting output from the segmentation model and class predictions from the predicted image into a fusion model;

receiving, as output from the fusion model, revised boundaries for each mask of the plurality of masks, the revised boundaries generated by fusing each mask with a boundary determined from the output from the segmentation model; and outputting classifications for each pixel of the raw image based on the revised boundaries.

2. The method of claim 1, wherein generating the segment around the representative points comprises drawing a boundary corresponding to a shape within the raw image.

3. The method of claim 2, wherein the fusion model further generates the classifications by:

for each segment, determining a representative class that corresponds to a majority of pixels within the segment; and assigning the representative class to the segment.

4. The method of claim 3, wherein each mask of the plurality of masks is ranked from largest to smallest, and wherein the representative class is assigned in decreasing order from a largest segment to a smallest segment.

5. The method of claim 1, wherein selecting the representative points comprises determining a core set for pixels within the mask, the core set determined by:

obtaining a subset of feature vectors for the pixels within the mask by sampling a plurality of feature vectors for each of the pixels within the mask; and adding additional ones of the plurality of feature vectors to the subset until a criterion is reached.

6. The method of claim 1, wherein selecting the representative points comprises applying a distance transformation for the pixels within the mask.

7. A non-transitory computer-readable medium comprising memory with instructions encoded thereon that, when executed, cause one or more processors to perform operations, the instructions comprising instructions to:

input a raw image into a machine learning model;

receive a predicted image comprising a plurality of masks as output from the machine learning model, each mask of the plurality of masks surrounding a plurality of pixels predicted to correspond to a given classification predicted by the machine learning model;

for each mask of the plurality of masks:

determine an extent of the mask using a connected components analysis;

allocate a number of points based on a relative extent of the mask as compared to given extents of each other mask of the plurality of masks;

select representative points corresponding to the number of points that are representative of an area within the mask;

input the raw image and the representative points from the predicted image into a segmentation model and receiving output from the segmentation model including, for each mask, a segment around the representative points;

input output from the segmentation model and class predictions from the predicted image into a fusion model;

receive, as output from the fusion model, revised boundaries for each mask of the plurality of masks, the revised boundaries generated by fusing each mask with a boundary determined from the output from the segmentation model; and output classifications for each pixel of the raw image based on the revised boundaries.

8. The non-transitory computer-readable medium of claim 7, wherein generating the segment around the representative points comprises drawing a boundary corresponding to a shape within the raw image.

9. The non-transitory computer-readable medium of claim 8, wherein the fusion model further generates the classifications by:

for each segment, determining a representative class that corresponds to a majority of pixels within the segment; and assigning the representative class to the segment.

10. The non-transitory computer-readable medium of claim 9, wherein each mask of the plurality of masks is ranked from largest to smallest, and wherein the representative class is assigned in decreasing order from a largest segment to a smallest segment.

11. The non-transitory computer-readable medium of claim 7, wherein selecting the representative points comprises determining a core set for pixels within the mask, the core set determined by:

obtaining a subset of feature vectors for the pixels within the mask by sampling a plurality of feature vectors for each of the pixels within the mask; and adding additional ones of the plurality of feature vectors to the subset until a criterion is reached.

12. The non-transitory computer-readable medium of claim 7, wherein selecting the representative points comprises applying a distance transformation for the pixels within the mask.

13. A system comprising:

memory with instructions encoded thereon; and one or more processors that, when executing the instructions, are caused to perform operations comprising:

inputting a raw image into a machine learning model;

receiving a predicted image comprising a plurality of masks as output from the machine learning model, each mask of the plurality of masks surrounding a plurality of pixels predicted to correspond to a given classification predicted by the machine learning model;

for each mask of the plurality of masks:

determining an extent of the mask using a connected components analysis;

allocating a number of points based on a relative extent of the mask as compared to given extents of each other mask of the plurality of masks;

selecting representative points corresponding to the number of points that are representative of an area within the mask;

inputting the raw image and the representative points from the predicted image into a segmentation model and receiving output from the segmentation model including, for each mask, a segment around the representative points;

inputting output from the segmentation model and class predictions from the predicted image into a fusion model;

receiving, as output from the fusion model, revised boundaries for each mask of the plurality of masks, the revised boundaries generated by fusing each mask with a boundary determined from the output from the segmentation model; and outputting classifications for each pixel of the raw image based on the revised boundaries.

14. The system of claim 13, wherein generating the segment around the representative points comprises drawing a boundary corresponding to a shape within the raw image.

15. The system of claim 14, wherein the fusion model further generates the classifications by:

for each segment, determining a representative class that corresponds to a majority of pixels within the segment; and assigning the representative class to the segment.

16. The system of claim 15, wherein each mask of the plurality of masks is ranked from largest to smallest, and wherein the representative class is assigned in decreasing order from a largest segment to a smallest segment.

17. The system of claim 13, wherein selecting the representative points comprises determining a core set for pixels within the mask, the core set determined by:

obtaining a subset of feature vectors for the pixels within the mask by sampling a plurality of feature vectors for each of the pixels within the mask; and adding additional ones of the plurality of feature vectors to the subset until a criterion is reached.

* * * * *